(12) United States Patent
Douglass, III (10) Patent No.: US 8,991,830 B2
(45) Date of Patent: Mar. 31, 2015

(54) HEAT-FUSIBLE GASKET AND METHOD OF MANUFACTURE

(75) Inventor: Carl R. Douglass, III, Willmar, MN (US)

(73) Assignee: Prinsco, Inc., Willmar, MN (US)

( * ) Notice: Subject to any disclaimer, the term of this patent is extended or adjusted under 35 U.S.C. 154(b) by 69 days.

(21) Appl. No.: 13/393,333

(22) PCT Filed: Oct. 5, 2010

(86) PCT No.: PCT/US2010/051399
§ 371 (c)(1),
(2), (4) Date: Feb. 29, 2012

(87) PCT Pub. No.: WO2011/044080
PCT Pub. Date: Apr. 14, 2011

(65) Prior Publication Data
US 2012/0153578 A1   Jun. 21, 2012

Related U.S. Application Data

(60) Provisional application No. 61/249,136, filed on Oct. 6, 2009.

(51) Int. Cl.
H02G 15/04 (2006.01)
F16J 15/06 (2006.01)
F16J 15/02 (2006.01)
F16L 25/00 (2006.01)

(52) U.S. Cl.
CPC ............. *F16J 15/061* (2013.01); *F16J 15/027* (2013.01); *F16L 25/0054* (2013.01)
USPC ............................ 277/625; 277/602; 277/616

(58) Field of Classification Search
USPC ................................... 277/602, 616, 617, 625
See application file for complete search history.

(56) References Cited

U.S. PATENT DOCUMENTS

| 3,744,823 A | 7/1973 | Muir et al. |
| 3,943,334 A | 3/1976 | Sturm |
| 4,727,242 A | 2/1988 | Barfield |
| 4,929,817 A | 5/1990 | Mito et al. |
| 4,994,655 A | 2/1991 | Handa et al. |
| 5,116,082 A | 5/1992 | Handa et al. |
| 5,125,690 A | 6/1992 | Taylor et al. |

(Continued)

FOREIGN PATENT DOCUMENTS

| JP | 7205296 | 8/1995 |
| JP | 9100971 | 4/1997 |
| JP | 2000088170 | 3/2000 |

*Primary Examiner* — Gilbert Lee
(74) *Attorney, Agent, or Firm* — Schroeder & Siegfried, P.A.

(57) ABSTRACT

A heat-fusible gasket for affecting a flexible seal between two adjoining components of a coupling, such as the spigot end of a section of plastic pipe and a bell coupler to be fitted thereover. The gasket has an inner core which is constructed of an elastomeric material, and outer opposing sealing surfaces that are formed at least in part of a heat-fusible material that is compatible with the heat-fusible components with which the gasket is intended to engage. The gasket is co-extruded in continuous lengths with electrically conductive heat resistance wires embedded in the outer compatibly heat-fusible layers. For annular gaskets, the co-extruded lengths of gasket material may be cut and spliced into any desired diameter gasket. Upon connection to a power source, the gasket seal is perfected through electrofusion along the opposing sealing surfaces of the gasket, thereby providing enhanced sealing capability.

25 Claims, 5 Drawing Sheets

(56) References Cited

U.S. PATENT DOCUMENTS

| | | | |
|---|---|---|---|
| 5,320,697 A * | 6/1994 | Hegler et al. | 156/158 |
| 5,386,101 A | 1/1995 | Steinmetz et al. | |
| 5,697,143 A | 12/1997 | Barfield | |
| 5,708,251 A | 1/1998 | Naveh | |
| 5,820,720 A | 10/1998 | Campbell | |
| 5,836,621 A | 11/1998 | Campbell | |
| 5,951,902 A | 9/1999 | Goodman et al. | |
| 5,975,587 A | 11/1999 | Wood et al. | |
| 6,149,756 A * | 11/2000 | Jarvenkyla | 156/273.9 |
| 6,179,346 B1 * | 1/2001 | Robson | 285/314 |
| 6,680,464 B1 | 1/2004 | Carter et al. | |
| 7,207,601 B2 | 4/2007 | Baharav | |
| 2002/0093193 A1 | 7/2002 | Bridgstock et al. | |
| 2006/0202471 A1 | 9/2006 | Weisbond et al. | |

* cited by examiner

HEAT-FUSIBLE GASKET AND METHOD OF MANUFACTURE

BACKGROUND OF THE INVENTION

The present invention relates generally to the art of gaskets used in coupling systems for connecting any of a variety of relatively large plastic parts where large tolerances and exaggerated surface irregularities tend to exist. More particularly, the present invention pertains to the construction of gaskets used to seal relatively large pipe, tubing, fittings, tanks, vessels and the like, which are manufactured as components and assembled and sealed separately in the field. Although the present invention has application to virtually any type plastic component, it is particularly well suited for use in connection with larger bell and spigot type coupling joints between adjoining sections of plastic pipe, where watertight integrity is oftentimes especially critical. For this reason, the following discussion will focus primarily on the construction and use of the present invention in relation to bell and spigot type couplings joints for pipe, it being understood that the principles set forth herein apply equally to seals utilized in the coupling joints of other plastic components.

Plastic piping is growing in acceptance for use in water, sanitary, chemical, and storm sewer transfer applications. Under current standards established by the American Society of Testing and Materials (ASTM), it is required that corrugated high density polyethylene (HDPE) pipe intended for use in certain drain and gravity sewage applications achieve a watertight joint to a pressure of 10.8 psi (74.5 kPa) during laboratory testing. Certain field tests, however, may also be conducted on installed watertight pipe. Such filed tests typically comprise a short term hydrostatic or air pressure test where a specified amount of leakage is allowed. The applied pressure is typically 3.50-4.50 psi (24.1-31.0 kPa), and the length of test and allowable leakage is dependent on the specific project, diameter of pipe and length of run. A common criterion is 200 gallons per inch diameter per mile of pipe per day. These are standard storm sewer requirements; however, when you begin to approach sanitary sewer applications, or low head irrigation lines (under 20 psi) (137.9 kPa)), or other industrial applications, it becomes much more important to have zero or near zero leakage.

Many plastic piping applications are now moving toward minimal leakage requirements or low pressure operating conditions. Specifically, many sanitary sewerage, water transfer or storage, and industrial piping applications require zero leakage to prevent environmental damage, resource wastes, and to mitigate treatment costs of effluent leaking into or out of pipe joints. While many different pipe materials have been used for these applications, including without limitation, solid wall High Density Polyethylene (HDPE), Polyvinyl Chloride (PVC) pipe, etc., corrugated plastic pipe is becoming increasingly popular due to the durability, light weight, ease of handling, and lower cost structure. Particularly in watertight gravity-flow drainage, water storage and sewage applications, HDPE or polypropylene (PPE) corrugated plastic pipe are now in common use.

Traditionally, the pipe joints of these products are typically comprised of a bell and a spigot, with a gasket used to seal the connection between the two joint ends. These types of joints are generally suitable for standard storm drainage applications where moderate leakage is tolerable; however, they are not well suited for applications where low pressure conditions exist or where leakage is a critical concern. In order for a gasketed bell and spigot joint to resist leakage, the gasket must exert a relatively considerable compressive force against both the spigot and bell. If a spigot is not properly inserted into a bell, there is a risk of the gasket becoming dislodged or "rolled," thereby preventing the necessary amount of compressive force to create a leak resistant joint. Even if the joints are properly assembled, the significant compressive force can cause "creep" in the plastic bell or spigot, whereby the bell may creep outward and the spigot inward, thereby relieving the gasket compression and allowing leakage through the joint.

Electrofusion technology has previously been utilized in jointing systems for plastic pipes to create a welded joint between two abutting pipe ends. While generally suitable for piping systems of smaller diameters, such technology has proven to be more difficult to employ and generally incompatible with larger diameter profile wall plastic pipe, and bell and spigot jointing systems, due primarily to manufacturing tolerances, pipe design and cost. Variations in pipe diameter from nominal, degrees of ovality and alignment problems, all of which are difficult to eliminate, make the use of such technology extremely difficult for joining pipes of larger diameters.

Consequently, it is evident that in order to achieve a positive seal and provide a substantially leak-proof bell and spigot joint that is capable of use in low pressure conditions, or where leakage is a critical concern, a new approach is necessary. There is a distinct need in the plastic pipe industry for a bell and spigot type jointing system that will address the dimensional and gasket-related issues associated with larger diameter pipes, and achieve such a positive seal and substantially leak-proof pipe joint.

BRIEF SUMMARY OF THE INVENTION

In accordance with the present invention, a gasket is provided for sealing between plastic components where large tolerances and exaggerated surface irregularities may tend to exist, or where watertight integrity is of critical importance. One application of particular relevance involves sealing between the spigot end of a section of large diameter plastic pipe and a bell coupler to be fitted thereover. For this application, the gasket is generally annular in shape and constructed at least in part of a heat-fusible material that is compatible with at least one of the coupling engagement surfaces with which it is intended to engage (i.e., the spigot OD and/or bell ID). For purposes of the present illustration, it is contemplated that the bell coupler may be formed integrally as a part of an adjoining section of pipe or as a separate fitting.

In one embodiment, at least a portion of both the inner and outer diametrical surfaces of the gasket are formed of a heat-fusible material that is compatible with the respective coupling engagement surfaces of the spigot and bell. In this case, the core of the gasket is preferably formed of a relatively flexible, resilient material, such as rubber, silicone or other elastomeric material. A thin layer of heat-fusible material is then bonded through known extrusion techniques to the inner elastomeric core to form the fusion-compatible inner and outer diametrical gasket surfaces.

At least partially embedded within the heat-fusible material of each of the inner and outer diametrical gasket surfaces are one or more electrical resistance heating wires. Such wires may be formed of Nickel Chromium, copper or other material with suitable electrical conductance and resistance properties, and are arranged for connection to a power source through a set of insulated lead wires. In this embodiment, the gasket seal may be perfected through electrofusion along both the inner and outer diametrical surfaces of the gasket, providing enhanced sealing capability for use in high performance, zero leakage watertight applications.

The use of such a dual-material gasket with built-in electrical resistance wires effectively addresses pipe manufacturing tolerance issues while providing a solution to fuse the bell to the spigot, thereby creating an effective and substantially leak-proof joint. The gasket core is comprised of an elastomeric material which is compressed between the spigot and adjoining bell coupler upon installation, thus accounting for inconsistencies in nominal pipe diameter, ovality and/or other dimensional control issues. The electrical resistance wires formed in the inner and outer heat-fusible surfaces of the gasket then function as a heating element to effectively fuse the gasket to the fusion-compatible bell and spigot pipe sections, thereby creating an effective sealed pipe joint that is substantially leak-proof.

In an alternative embodiment, it is contemplated that the gasket may be formed with a heat-fusible material bonded to the core material at only one of either the inner or outer diametrical surfaces. In still another embodiment, it is contemplated that the gasket may be formed entirely of a heat-fusible material that is compatible with the respective coupling engagement surfaces of the spigot and bell. In either case, one or more electrical resistance heating wires may be at least partially embedded within the heat-fusible material adjacent the inner and outer diametrical surface(s) of the gasket, and arranged for connection to a power source through a set of insulated lead wires. Although the use of electrofusion is considered the preferred means by which heat is provided for causing fusion of the gasket to the mating pipe sections, it is certainly contemplated and considered within the scope of the present invention to utilize other and/or additional sources of heat to effect fusion between the gasket and mating sections of pipe.

In still further embodiments, it is contemplated that the outer layer of heat-fusible material may fully encompass the inner elastomeric core of the gasket. Alternatively, the outer layer of heat-fusible material may cover only a portion of the circumference of the gasket that is intended to engage a coupling engagement surface(s) of the adjoining sections of pipe. By way of example and without limitation, this could cover at least a portion of one or both the crown (i.e., OD) or seat (i.e., ID) of the gasket, or the crown and at least a portion of one of the annular sides or shoulders of the gasket.

The gasket of the present invention may be manufactured in varying size diameters using an extrusion process. For dual-material gaskets, the core elastomeric material and outer heat-fusible layers are co-extruded using known techniques in the art. One or more electrical resistance wires may be embedded into the outer heat-fusible layer(s) during the extrusion process, such that the resulting extrusion constitutes a continuous length of gasket material that may be cut and spliced to form any desired gasket diameter. Separate parallel conductive strips/lead wires may then be connected to the respective lead ends of the electrical resistance wires and adhered to the gasket surface.

With the present gasket system, upon forming a bell and spigot pipe joint, the gasket will be disposed between the spigot end and bell coupler with the conductor lead wires available for connection to the positive and negative terminals of a power source. When the circuit is completed, the electrically resistive windings act as a heat element to cause fusion of the gasket to the spigot and bell sections of the pipe jointing system, thus achieving a positive seal and an effective substantially leak-proof pipe joint.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which.

DETAILED DESCRIPTION OF THE INVENTION

As noted previously, although the present invention has application to the coupling of virtually any plastic components where large tolerances and exaggerated surface irregularities may tend to exist, it will be appreciated that the principles of the present invention are particularly well suited for larger diameter plastic bell and spigot pipe configurations utilized in sanitary sewerage, water transfer or storage, and industrial piping applications. In such applications, maintaining watertight integrity is oftentimes especially critical to prevent environmental damage, resource wastes, and to mitigate treatment costs of effluent leaking into or out of pipe joints.

Figure 1:
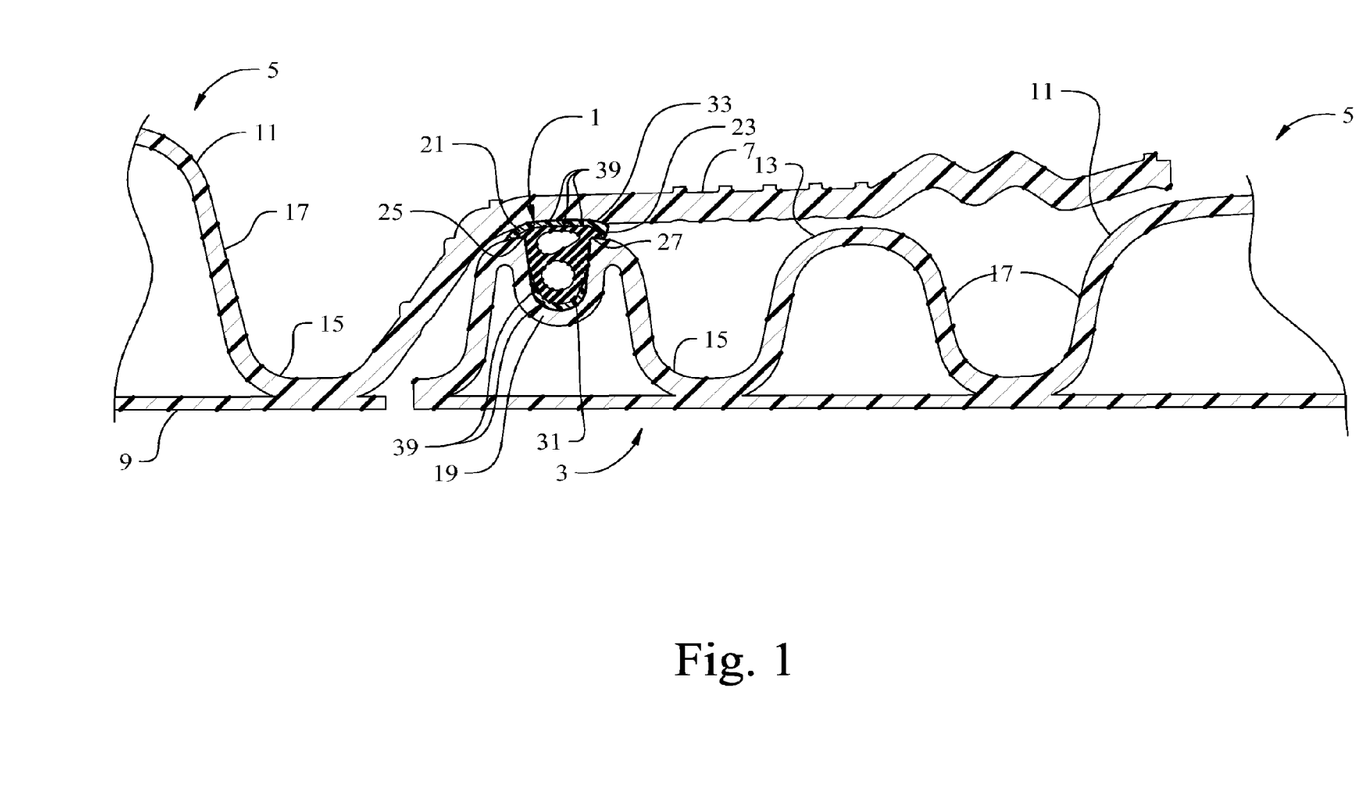
FIG. 1 is a vertical sectional view of a typical bell and spigot pipe joint carrying an heat-fusible pipe gasket constructed in accordance with the present invention.

With reference now being made to the drawings, FIG. 1 shows a gasket or sealing element 1 constructed in accordance with the present invention and adapted for sealing between the male or spigot end 3 of a section of plastic pipe 5 and a female bell coupler 7 to be fitted thereover. In one common piping configuration, which has been depicted in the drawings for illustration purposes, a plurality of individual pipe sections 5 are configured such that one end forms a male spigot 3 and the opposite end forms a corresponding female bell coupler 7. Such sections of pipe 5 are designed to be connected end-to-end in a manner as shown in FIG. 1, with the spigot end 3 of one section of pipe 5 mating with the female bell coupler end 7 of an adjoining section of pipe 5 having similar construction. As shown, gasket 1 is disposed in sealing relation between the spigot end 3 of one section of pipe 5 and the bell coupler end 7 of the adjoining section of pipe 5.

The adjoining sections of pipe 5 shown in FIG. 1 are also depicted for illustration purposes as "dual" wall corrugated pipe. Such dual wall pipe typically comprises an interior cylindrical wall structure 9 with an exterior corrugated annular wall structure 11. Each annular corrugation of the exterior wall structure 11 is defined by a crown or peak 13 connected to an adjoining trough or valley 15 by side walls 17. Although it is contemplated that gasket 1 could be disposed anywhere in sealing relation between the adjoining spigot 3 and bell coupler 7, FIG. 1 discloses the gasket 1 as being seated in an annular gasket-receiving cavity or recess 19 formed in the crown 13 of the final corrugation of spigot end 3.

The gasket 1 is constructed primarily of a flexible elastomeric material and, in the present illustration, is generally annular in shape so as to seat within cavity 19 and extend around the exterior corrugated wall 11 of the spigot end 3 of pipe 5. As shown in FIG. 1, the radial cross-sectional diameter of gasket 1 is slightly greater than the depth of cavity 19, such that upon coupling, gasket 1 will fill cavity 19 and be compressed in sealing relation between the spigot end 3 and bell coupler 7 of adjoining sections of pipe 5.

Figure 2:
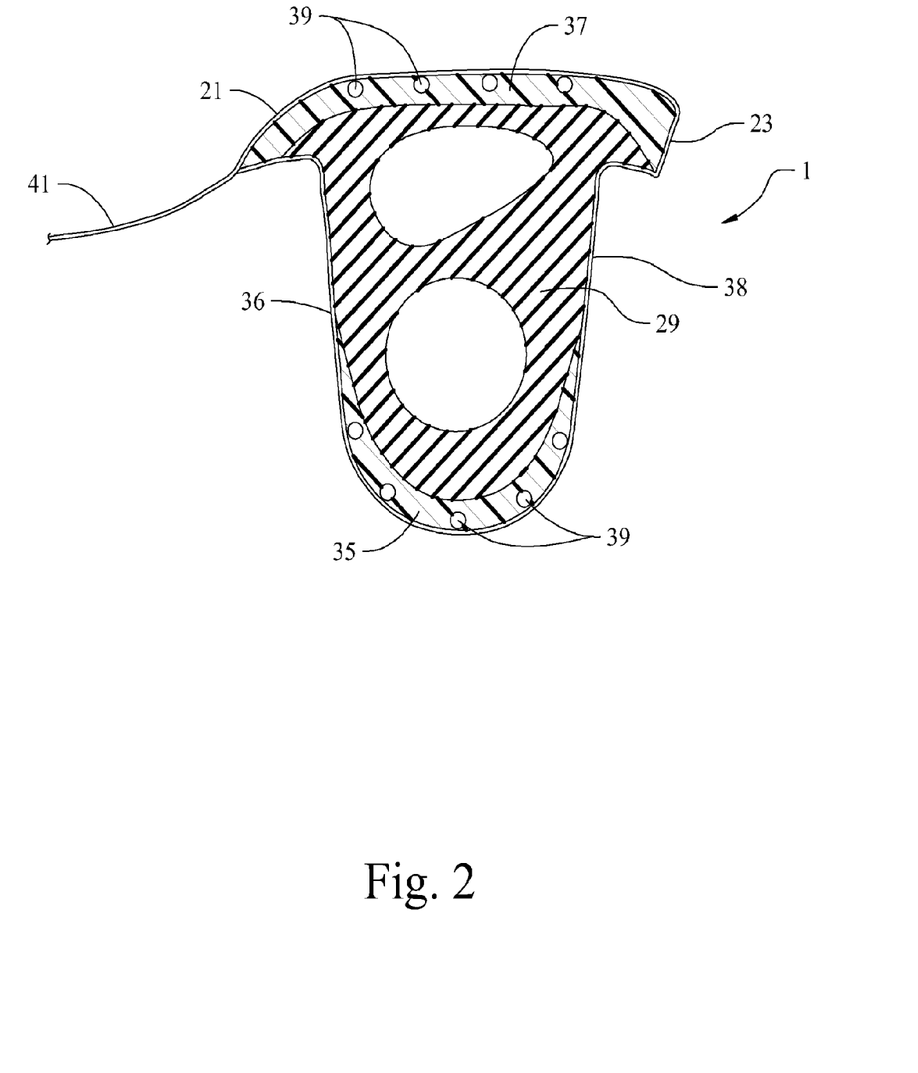
FIG. 2 is vertical cross section of the heat-fusible pipe gasket shown if FIG. 1, showing the dual-material construction thereof, with an inner elastomeric core and outer sealing portions encasing the core that are formed of a material compatibly heat-fusible with the pipe.
Figure 3:
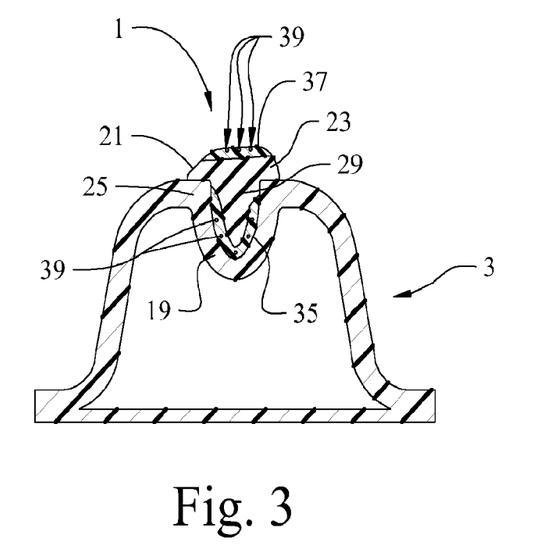
FIG. 3 is a vertical sectional view of an alternative embodiment of a heat-fusible gasket constructed in accordance with the present invention, showing separate diametrically opposed sealing portions formed of a material that is compatibly heat-fusible with the pipe.

The gasket 1 shown in FIGS. 1 and 2 also includes forward and rearward flange elements 21 and 23, respectively, which extend over the corresponding cavity shoulders 25 and 27 of gasket-receiving cavity 19. As shown in FIG. 1, both flanges 21 and 23 extend outward over a portion of the corrugation crown 13 to provide a broader sealing surface and help prevent gasket 1 from rolling out of cavity 19 upon installation. The forward flange element 21 tapers away from the body of gasket 1 toward the free end of spigot 3 and is configured to facilitate ease of installation within the bell coupler 7 of an adjoining section of pipe 5.

As shown best in FIG. 2, it is contemplated that gasket 1 shall have an interior core 29 that is constructed of a suitable elastomeric material, such as ethylene propylene rubber (EPM), ethylene propylene diene rubber (EPDM) or, without limitation, various other types of elastomers or thermoplastic elastomers (TPE). Gasket 1, however, is also constructed at least in part of inner and outer circumferential pipe-engaging portions 35 and 37, respectively, that are formed at least in part of a material that is compatibly heat-fusible with at least a part of one of the coupling engagement surfaces with which it is intended to engage (i.e., the spigot OD and/or bell ID). As used herein and throughout the appended claims, the wording "compatibly heat-fusible" or its equivalent shall mean capable of fusion through the application localized heat under low pressure conditions (i.e., without requiring use of high pressure co-extrusion techniques). Stated otherwise, as shown best in FIG. 2, gasket 1 is constructed at least in part of an outer heat-fusible material that is compatible with at least a part of the exterior pipe surface 31 of the spigot 3 defined by the gasket-receiving cavity 19 and/or the interior surface 33 of the adjoining bell coupler 7.

In one embodiment, as shown in FIGS. 1 and 2 of the drawings, at least a portion of both the inner and outer diametrical surfaces 35 and 37, respectively, of the gasket 1 are formed of a material that is compatibly heat-fusible with the respective coupling engagement surfaces 31 and 33 of the spigot 3 and bell 7. As shown in FIG. 2, the heat-fusible layer 35 extends at least partially around and is fused to the elastomeric core 29 of gasket 1 at the inner annular diametrical surface thereof. Similarly, the compatibly heat-fusible layer 37 extends across and is fused to the elastomeric core 29 of gasket 1 along the outer diametrical surface thereof.

At least partially embedded within the compatibly heat-fusible layers 35 and 37 of the gasket 1 are one or more electrical resistance heating elements, such as copper wires 39, or other suitable electrically conductible materials. As shown, wires 39 are arranged for connection to a power source (not shown) through a set of insulated lead wires 41. In this embodiment, the seal of gasket 1 may be perfected through electrofusion along both the inner and outer diametrical surfaces of the gasket 1, thereby providing a thermally bonded joint with enhanced sealing capability suitable for use in high performance, zero or near zero leakage watertight applications.

Depending on the material from which the adjoining sections of pipe 5 are constructed will dictate the appropriate material of the heat-fusible layers 35 and 37. For example, and without limitation, in such case that the adjoining sections of pipe 5 are constructed of a thermoplastic material such as HDPE, PPE or PVC, then it is contemplated that layers 35 and 37 will also be formed of the same material, or of another material that is compatibly heat-fusible therewith. It is contemplated that the thickness of layers 35 and 37 should be relatively thin so as to promote adequate heating of the material and fusion with the respective coupling surface.

Flexibility of the core 29 is needed, amongst other reasons, to account for potential deflection or movement within the pipe system once the joint has been assembled. For that reason, it is contemplated that a relatively low durometer would be most applicable, but the overall gasket 29 will obviously need to be designed to prevent the need of excessive stretch for installation onto the spigot 3 as well. Depending on the particular application, gasket design and/or pipe size being utilized, the relative hardness and/or elasticity of the material from which the elastomeric core 29 is formed may vary, but it is contemplated that core hardness in the range of 35-70 durometer will be suitable for most applications. Although the elastomeric core will likely be the most flexible component of the gasket 1, the outer heat-fusible layers 35 and 37, as well as the resistance wires 39 will also need to be relatively flexible in order to facilitate proper installation and use.

The use of such a dual-material gasket 1 with built-in electrofusion heating elements 39 effectively addresses pipe manufacturing tolerance issues while providing a solution to fuse the bell 7 and spigot 3 of adjoining pipe sections 5, thereby creating an effective sealed pipe joint that is substantially leak-proof. The gasket core 29 is comprised of an elastomeric material which is compressed between the spigot 3 and adjoining bell coupler 7 upon installation, thus accounting for inconsistencies in nominal pipe diameter, ovality and/or other dimensional control issues. The electrical resistance wires 39 formed in the inner and outer heat-fusible layers 35 and 37 of the gasket 1 then function as a heat element to effectively fuse or thermo-bond the gasket 1 to the fusion-compatible bell 7 and spigot 3 sections of the piping system, thereby creating an effective and substantially leak-proof joint.

Notably, the compatibly heat-fusible layers 35 and 37 as depicted in FIG. 2 cover the complete inner and outer circumferential surfaces, respectively, of the gasket 1. It will be appreciated, however, that layers 35 and 37 could also be configured to taper coextensively together along each of the sides 36 and 38 of the gasket 1 to fully encompass the inner elastomeric core 29. In other embodiments, the compatibly heat-fusible material comprising layers 35 and 37 of gasket 1 may cover only more limited portions of the cross-sectional circumferential profile of gasket 1, as illustrated in FIGS. 3-7. By way of example and without limitation, the compatibly heat-fusible material could cover at least a portion of one or both the crown (i.e., OD) or seat (i.e., ID) of the gasket (see, FIG. 3), or a portion of the crown and at least a portion of one of the annular sides or shoulders of the gasket (see, FIG. 5).

Figure 4:
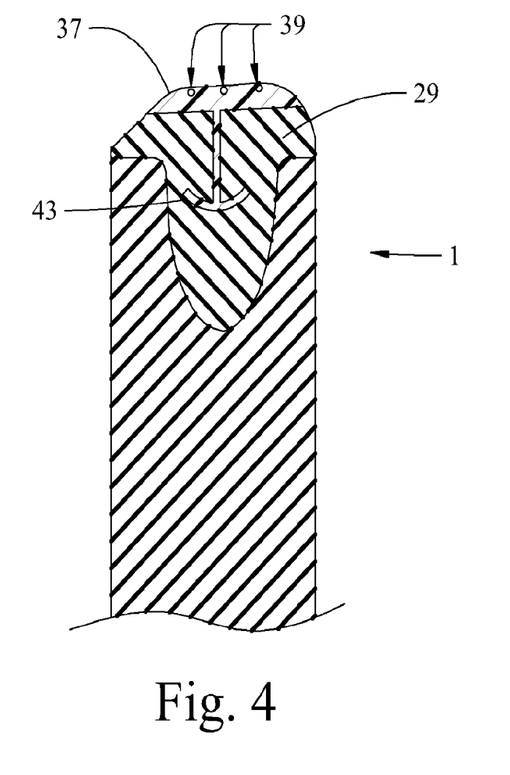
FIG. 4 is a vertical sectional view of another alternative embodiment of a heat-fusible gasket constructed in accordance with the present invention, showing an embedded anchoring mechanism for the compatibly heat-fusible layer thereof.

In one alternative embodiment, as shown in FIG. 4, it is contemplated that the gasket 1 may be formed with a compatibly heat-fusible material bonded to the core material 29 at only one of either the inner or outer diametrical surfaces 35 or 37 thereof. For instance, as shown in FIG. 4, it is possible for only the compatibly heat-fusible layer 37 to be fused to the core 29 of the gasket 1, thereby facilitating heat fusion only between the gasket 1 and the bell coupler 7 of an adjoining section of pipe 5. Alternatively, only the inner diametrical layer 35 of compatibly heat-fusible material may be fused to the core 29 of gasket 1, thus facilitating heat fusion only between the gasket 1 and spigot end 3 of a section of pipe 5. In either case, significant benefits are still obtained in that enhanced sealing capability is achieved along one of the diametrical surfaces of gasket 1, and the superior heat-fusion bond created helps prevent the gasket 1 from becoming dislodged or unseated as a result of installation, increasing internal hydrostatic pressure within the pipe system, or increasing external hydrostatic pressure due to project conditions.

It is also contemplated that the compatibly heat-fusible layers 35 and/or 37 could also optionally be formed with an integral anchoring mechanism 43 extending into the core 29, such as that shown with outer layer 37 in FIG. 4. This is not deemed absolutely necessary, since the bond between the elastomeric core 29 and outer thermoplastic layers 35 and 37 is formed through high pressure co-extrusion, which forms a deeper bond of the differing materials. However, due to the different molecular structure of elastomers and thermoplastics, without utilizing such high pressure extrusion techniques, as a general matter, such materials are not considered "compatibly heat-fusible" (i.e., localized heat applied under low pressure conditions, as during "in-field" pipe installations). Therefore, the use of such an anchor 43, while optional, may provide additional strength to the bond between such materials.

Figure 5:
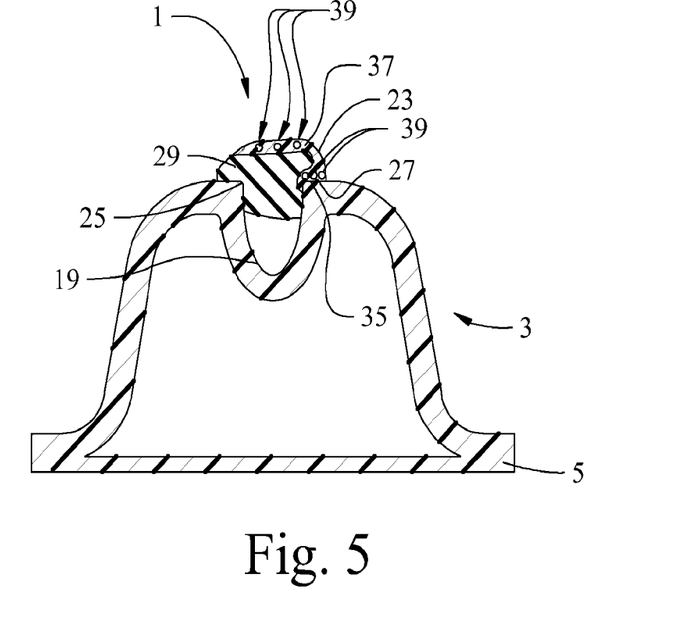
FIG. 5 is a vertical sectional view of still another alternative embodiment of a heat-fusible gasket constructed in accordance with the present invention, showing a different configuration of the core material and compatibly heat-fusible portions of the gasket.

As shown in FIG. 5, in another embodiment of gasket 1, the outer compatibly heat-fusible layer 37 extends across the top crown portion of the gasket and intersects the inner compatibly heat-fusible layer 35 along the back flange 23 thereof. The inner heat-fusible layer 35, in turn, is disposed so as to wrap around the shoulder 27 of the gasket cavity 19 formed in the corrugation crown 13 of a spigot end 3 of pipe 5. With the electrical resistance wires 39 embedded within layers 35 and 37, heat may be generated through electrofusion to effectively fuse or thermo-bond the gasket 1 to the fusion-compatible bell 7 (not shown) and spigot 3 sections of the piping system, thereby creating an effective and substantially leak-proof joint. As shown, the gasket 1 can be either seated partially within cavity 19 of the corrugation crown 13 or fully within cavity 19, as shown in FIG. 1.

Figure 6:
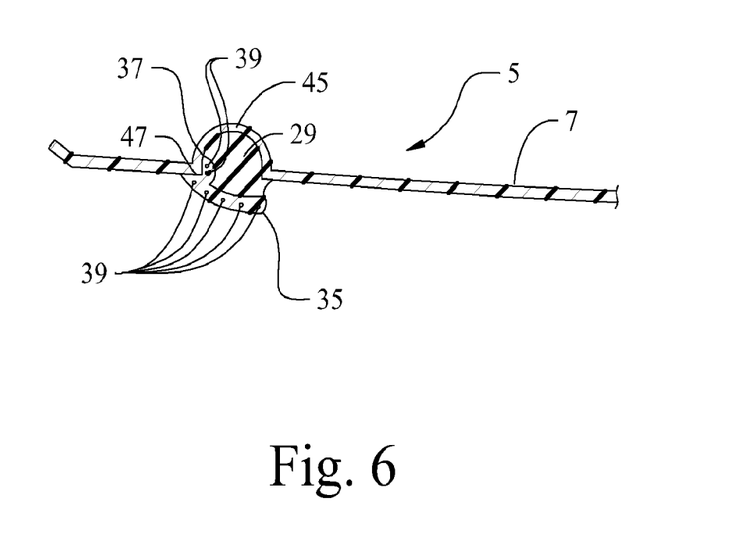
FIG. 6 is a vertical sectional view of another alternative embodiment of a heat-fusible gasket constructed in accordance with the present invention, showing a configuration of the gasket for seating within the recess of the bell coupler of a pipe.

With reference to FIG. 6, it is shown that gasket 1 could also be configured to be inverted and alternatively seat within a gasket receiving cavity 45 formed within the female bell coupler 7 of an adjoining section of pipe 5. In this embodiment, the inner compatibly heat-fusible layer 35 extends across the lower crown portion of the inverted gasket 1 and intersects the outer compatibly heat-fusible layer 37 along the front tapered flange 21 thereof. The outer heat-fusible layer 37, in turn, is disposed so as to wrap around the forward shoulder 47 of the gasket cavity 45 formed in the bell coupler 7 of pipe 5. With the electrical resistance wires 39 embedded within layers 35 and 37, heat may be generated through electrofusion to once again effectively fuse or thermo-bond the gasket 1 to the fusion-compatible bell 7 and spigot 3 (not shown) sections of the piping system, thereby creating an effective and substantially leak-proof joint In still another embodiment, it is contemplated that the gasket 1 may be formed entirely of a heat-fusible material that is compatible with the respective coupling engagement surfaces of the spigot 3 and bell coupler 7. Here again, one or more electrical resistance heating wires 39 may be at least partially embedded within the heat-fusible material adjacent the inner and outer diametrical surfaces of the gasket 1. As in previous embodiments, such wires 39 may be formed of copper or other suitable electrically conductible material, and are arranged for connection to a power source through a set of insulated lead wires 41. Although the use of electrofusion is considered the preferred means by which localized heat is provided for causing fusion of the gasket 1 to the bell 7 and spigot 3 of the mating pipe sections, it is contemplated that other and/or additional sources of heat may be utilized to effect fusion between the gasket 1 and mating sections of pipe without departing from the invention herein.

Figures 7, 8:
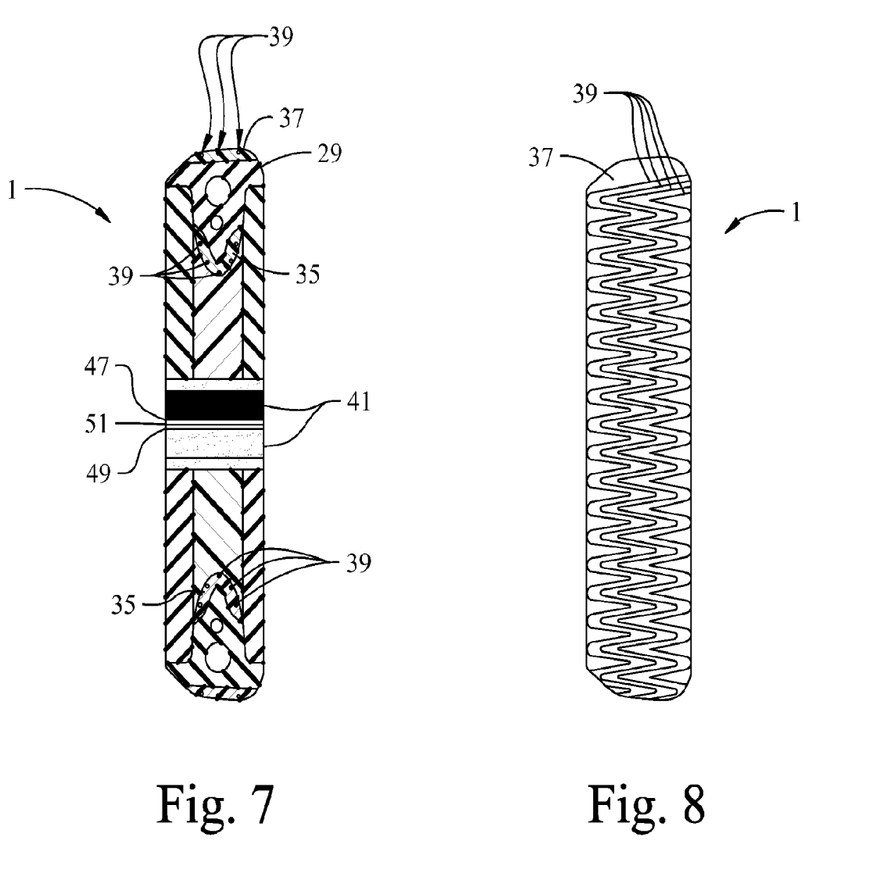
FIG. 7 is a vertical sectional view of a heat-fusible gasket constructed in accordance with the present invention, showing the manner in which a continuous length of co-extruded gasket material may be cut and spliced to form an annular gasket.
FIG. 8 is a top plan view of a heat-fusible gasket constructed in accordance with the present invention, showing an alternative manner in which electrofusion leads may be embedded into the compatibly heat-fusible layers of the gasket.

The gasket 1 of the present invention may be manufactured in varying size diameters using an extrusion process. Specifically, it is contemplated that the gasket 1 may be extruded, cut to varying lengths and spliced together as shown in FIG. 7 to form a variety of gaskets having differing diametrical sizes. In the case of dual-material gaskets, the core 29 and outer compatibly heat-fusible layers 35, 37 are co-extruded using known techniques, where the inner elastic core material is extruded into a die to fill the inner core while a compatibly heat-fusible polymer is extruded into the outer portions of the die to form the fusible layers 35, 37. The two materials will bond due to the temperatures and high pressure conditions utilized during the co-extrusion process, whereby both materials are heated to their optimum melt temperatures, blended together at there joint and co-extruded under high pressure (i.e., typically 2500-6000 psi). As shown best in FIG. 2, in one preferred embodiment, one or more electrical resistance elements or wires 39 are embedded into the outer heat-fusible layer(s) 35, 37 during the co-extrusion process, such that the resulting extrusion constitutes a continuous length of gasket material with an elastomeric core 29 and one or more outer heat-fusible layers 35, 37 bonded thereto.

Once extruded, the continuous length of gasket material may be cut to a specified length and, as shown in FIG. 7, the resulting gasket ends 47 and 49 may then be spliced together at point 51 to form any desired pipe diameter. To splice the gasket ends 47 and 49, a thin layer of insulating material (not shown) that is compatible with the pipe 5 and heat-fusible gasket layer(s) 35, 37 is first inserted between the opposing gasket ends 47 and 49. The gasket ends 47 and 49 are then placed against the insulating material and heated so as to splice the extruded gasket 1 into a fully fused circumference with separated opposing lead ends to the electrical resistance wire(s) 39. Alternatively, after cutting, the gasket ends 47 and 49 may be fused by simply using a heated mandrel or a flash type heat bulb to form the spliced gasket joint.

Once spliced, separate parallel conductive strips 41 are then stamped to the exterior of the spliced joint in contact with the respective lead ends to the heat resistance wires 39 (one conductor per side). A thin sheet of fusion-compatible material comprising an extension of layer 35 and/or 37 may then be wrapped around the conductors 41 and heated to promote adhesion to the gasket surface. With each of the conductors 41 connected to the positive and negative lead of a power source, the circuit is completed and the electrically resistive windings 39 act as a heat element to cause fusion of the gasket 1 to the spigot 3 and bell 7 sections of the pipe jointing system, thus achieving a positive seal and an effective substantially leak-proof pipe joint.

In one principal embodiment, as shown in FIG. 2 of the drawings, it is contemplated that the electrical heat resistance wires 39 will be embedded to run axially with the length of the continuous gasket material, such that upon formation of the gasket 1, the wires will extend annularly about the inner and/or outer circumferential surfaces 35, 37 of the gasket. It is contemplated, however, that the electrical heat resistance wires 39 could be disposed or configured differently without departing from the invention herein. For example, as shown in FIG. 8, it is possible that the heat resistance wires 39 could be embedded into the heat-fusible layers 35 and 37 and configured to zigzag back and forth throughout the length thereof. Alternatively, the heat resistance wires 39 could be embedded into an outer layer of heat-fusible material and configured to spiral around the length of gasket material, rather than axially therewith. Other configurations may also work equally as well.

It will, of course, be understood that various changes may be made in the form, details, arrangement and proportions of the parts without departing from the scope of the invention which comprises the matter shown and described herein and set forth in the appended claims.

The invention claimed is:

1. A gasket for forming a flexible watertight seal between two adjoining components of a coupling, the gasket comprising:
   (a) an annular sealing member defining a central opening and having a longitudinal axis extending circumferentially around said central opening, said sealing member having a core formed at least in part of a generally flexible elastomeric material;
   (b) a first portion of said sealing member being in direct engagement with a sealing surface of one of the adjoining components of the coupling;
   (c) a second portion of said sealing member being in direct engagement with a sealing surface of the other adjoining component of the coupling;
   (d) at least one of said first portion and said second portion of said sealing member comprising a homogeneous covering of material which extends continuously along said longitudinal axis substantially the circumference of said sealing member, and which is compatibly heat-fusible with at least one of the adjoining components of the coupling;
   (e) said compatibly heat-fusible material being of a different material composition than said core; and
   (f) said covering of material being devoid of interstices and maintaining watertight continuity throughout its length at all times when stretched circumferentially in the direction of said longitudinal axis.

2. The gasket defined in claim 1, wherein said compatibly heat-fusible material of at least a portion of said first and/or said second portions of said sealing member has an electrical heating member embedded therein through which electrical current may pass to generate heat.

3. The gasket defined in claim 2, wherein said electrical heating member is comprised of a plurality of electrical conducting wires.

4. The gasket defined in claim 1, wherein said core of said sealing member is formed at least in part of a thermoplastic elastomer.

5. The gasket defined in claim 1, wherein said elastomeric material of said core has a hardness value in the range of 35-70 durometer.

6. The gasket defined in claim 1, wherein at least one of said first and second portions of said sealing member is comprised of the same material as the adjoining component of the coupling that it is intended to engage.

7. The gasket defined in claim 6, wherein said compatibly heat-fusible material of at least a portion of said first and/or said second portions of said sealing member is a thermoplastic material.

8. The gasket defined in claim 1, wherein said compatibly heat-fusible material of at least a portion of said first and/or said second portions of said sealing member encases said core of said sealing member.

9. The gasket defined in claim 1, wherein said sealing member is annular in shape and said compatibly heat-fusible material of at least a portion of said first and/or said second portions of said sealing member extends the entire circumference of said sealing member.

10. The gasket defined in claim 9, wherein said first and second portions of said sealing member are diametrically opposed relative to one another.

11. The gasket defined in claim 10, wherein said compatibly heat-fusible material of at least a portion of said first and/or said second portions of said sealing member has an electrical heating member embedded therein through which electrical current may pass to generate heat, said heating element extending circumferentially around said sealing member.

12. The gasket defined in claim 11, wherein said heating element zigzags back and forth through said compatibly heat-fusible material of at least a portion of said first and/or said second portions of said sealing member.

13. The gasket defined in claim 1, wherein said sealing member is formed through a co-extrusion process of said core with said first and second portions thereof, said first and second portions of said sealing member being of a different material composition than said core and being formed throughout of said compatibly heat-fusible material with an electrical heating member embedded therein.

14. A gasket joint for affecting a watertight seal between two mating sections of pipe, the gasket joint comprising:
   (a) a first section of pipe having a generally cylindrical wall structure with a central axis extending therethrough;
   (b) a second section of pipe having a generally cylindrical wall structure which telescopes over said first section of pipe in generally coaxial relation thereto;
   (c) an annular sealing member defining a central opening and having a longitudinal axis extending circumferentially around said central opening, said sealing member being disposed between said first section of pipe and said second section of pipe, with said first section of pipe extending through said central opening, and said sealing member having an inner pipe-engaging portion seated against said first section of pipe and an outer pipe-engaging portion seated against said second section of pipe;
   (d) at least one of said inner pipe-engaging portion and said outer pipe-engaging portion of said sealing member comprising a homogeneous covering of material which extends continuously along said longitudinal axis substantially the circumference of said sealing member, and which is compatibly heat-fusible with at least one of said first section of pipe and said second section of pipe;

(e) at least a portion of said sealing member being formed of a more flexible material than the remainder of said sealing member; and (f) said covering of material being devoid of interstices and maintaining watertight continuity throughout its length at all times when stretched circumferentially in the direction of said longitudinal axis.

15. The gasket joint defined in claim 14, including an electrical heating element embedded within said compatibly heat-fusible material for causing the transfer of heat thereto.

16. The gasket joint defined in claim 14, wherein an exterior surface of said cylindrical wall structure of said first section of pipe defines a circumferential recess with opposing radially extending sides within which said sealing member seats, said sealing member extending radially outward beyond said exterior surface of said first section of pipe.

17. The gasket joint defined in claim 16, wherein at least one of said opposing sides of said recess terminates at an outermost axially extending crown portion of said first section of pipe, and said sealing member includes axially opposing flange portions, at least one of said flange portions extending axially over a said crown portion of said first section of pipe in engaging relation with said exterior surface of said first section of pipe.

18. The gasket joint defined in claim 17, wherein one of said flange portions of said sealing member is tapered to accommodate telescopic engagement of said second section of pipe over said first section of pipe.

19. The gasket joint defined in claim 17, wherein said flange portions are comprised of an elastomeric material.

20. The gasket joint defined in claim 17, wherein said flange portions are comprised of a material that is compatibly heat-fusible with at least one of said first and said second sections of pipe.

21. The gasket joint defined in claim 14, wherein said sealing member includes a central core portion disposed between said inner pipe-engaging portion and said outer pipe-engaging portion, said central core portion being formed of a flexible elastomeric material.

22. The gasket joint defined in claim 21, wherein said compatibly heat-fusible material is composed of a thermoplastic material with an electrical heating element embedded therein for causing the transfer of heat thereto.

23. A method of forming a heat-fusible gasket for use in producing a flexible watertight seal between two adjoining components of a coupling, the steps of forming the gasket comprising:

(a) co-extruding through a die a length of gasket material comprising a core portion and a pair of generally opposing outer sealing portions, wherein said core portion of said gasket is formed of a generally flexible elastomeric material and at least a part of one of said outer sealing portions forms a homogeneous covering of material which extends continuously throughout the length of said gasket material and is compatibly heat-fusible with at least one of the adjoining components of the coupling, said covering of material being devoid of interstices and capable of maintaining watertight continuity throughout its length at all times when stretched longitudinally along the length of said gasket material; and (b) embedding an electrically conductive resistance element within said compatibly heat-fusible material of said outer sealing portion of said gasket material during co-extrusion thereof.

24. The method of forming a heat-fusible gasket set forth in claim 23, including the further steps of:

(c) cutting said length of gasket material at a predetermined desired length to form opposite ends thereof; and (d) splicing said opposite ends of said gasket material together to form an annular sealing member.

25. The method of forming a heat-fusible gasket set forth in claim 24, wherein said step of co-extruding said gasket material includes forming said sealing portion thereof as a pair of generally diametrically opposing seal engagement surfaces, at least one of said opposing seal engagement surfaces being composed of a material different from said core which is compatibly heat-fusible with at least one of the adjoining components of the coupling.

* * * * *

UNITED STATES PATENT AND TRADEMARK OFFICE
CERTIFICATE OF CORRECTION

| | | |
|---|---|---|
| PATENT NO. | : 8,991,830 B2 | Page 1 of 1 |
| APPLICATION NO. | : 13/393333 | |
| DATED | : March 31, 2015 | |
| INVENTOR(S) | : Carl R. Douglass, III | |

It is certified that error appears in the above-identified patent and that said Letters Patent is hereby corrected as shown below:

In the Claims

Column 10, Claim 14, Line 1, please change "affecting" to --forming--.

Signed and Sealed this
Fifteenth Day of September, 2015

Michelle K. Lee
*Director of the United States Patent and Trademark Office*